Oct. 14, 1969  A. KLEIN  3,471,962
TOY BOOK
Filed April 8, 1966  2 Sheets-Sheet 1
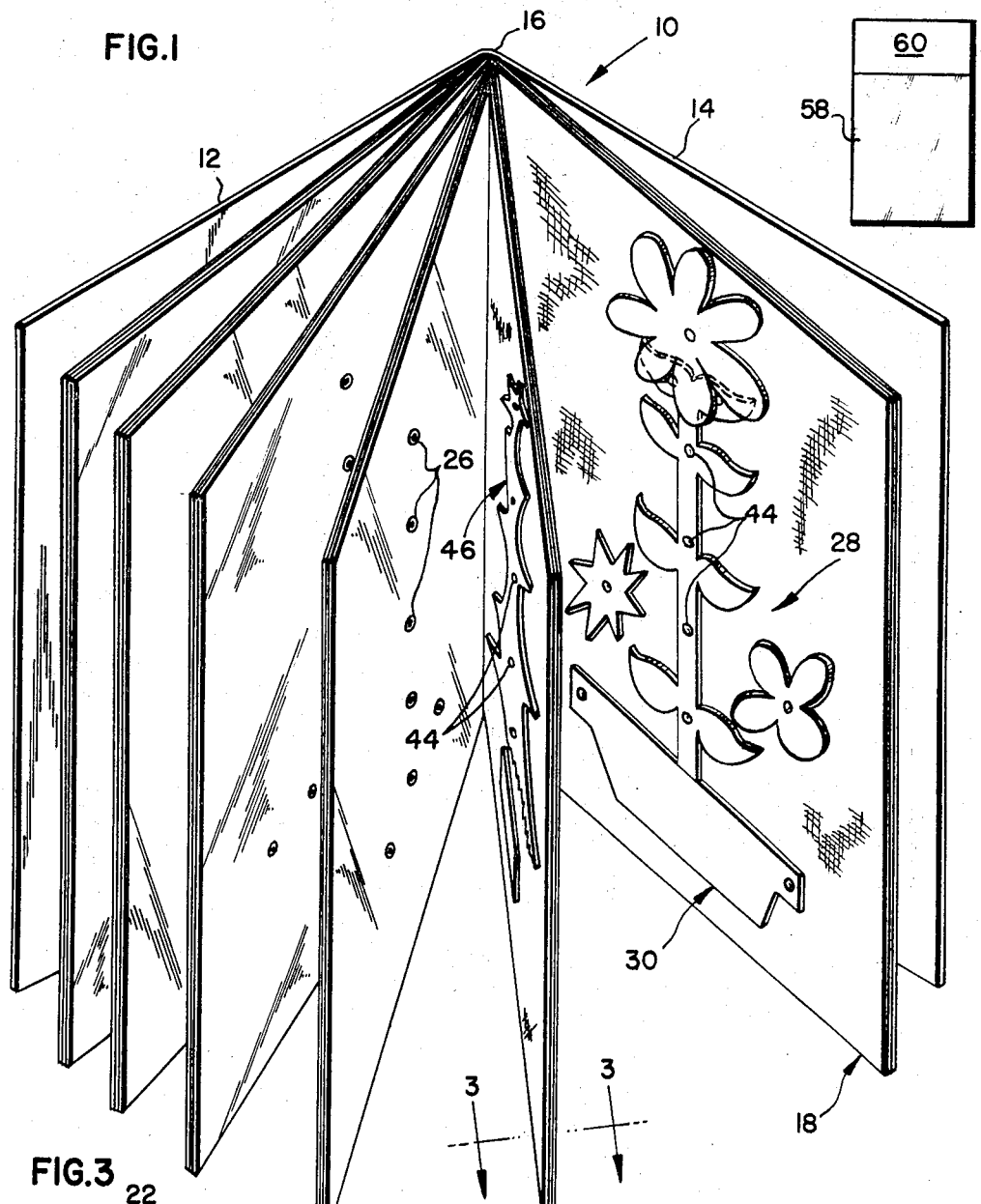
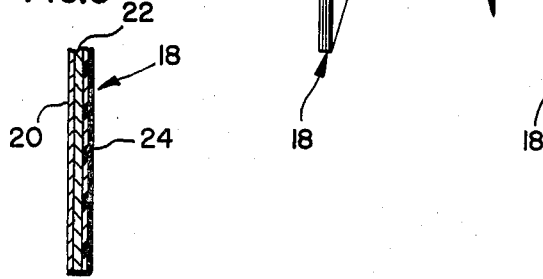
INVENTOR.
ANNE KLEIN
BY Rackenbach & Siegel
ATTORNEYS Oct. 14, 1969   A. KLEIN   3,471,962
TOY BOOK
Filed April 8, 1966   2 Sheets-Sheet 2
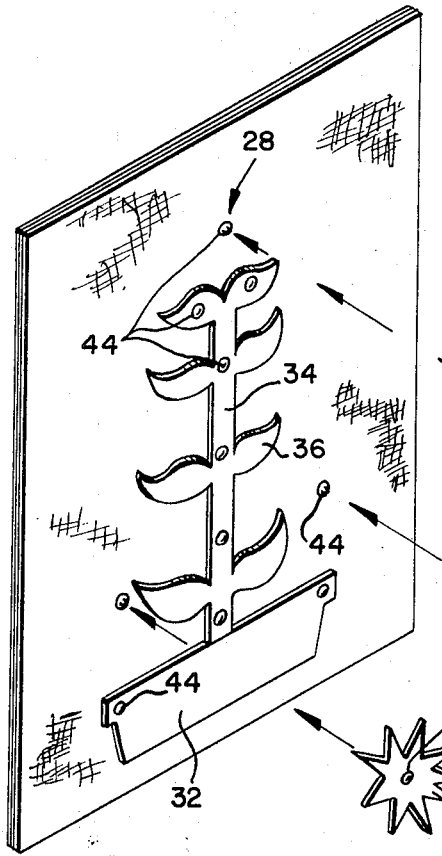
FIG.4
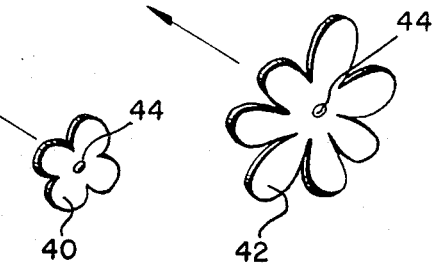
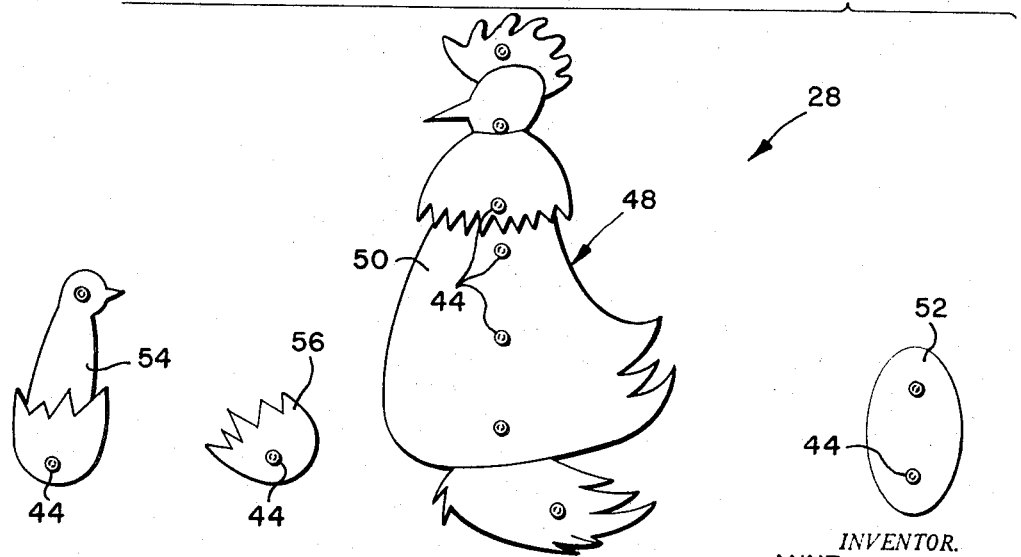
FIG.5
INVENTOR.
ANNE KLEIN
BY
ATTORNEYS

United States Patent Office 3,471,962
Patented Oct. 14, 1969

3,471,962
TOY BOOK
Anne Klein, 166 E. 65th St., New York, N.Y. 10021
Continuation-in-part of application Ser. No. 513,316,
Dec. 13, 1965. This application Apr. 8, 1966, Ser.
No. 541,272
Int. Cl. A63h 33/00, 33/38
U.S. Cl. 46—22         7 Claims

ABSTRACT OF THE DISCLOSURE

The present invention pertains, generally, to an article of manufacture, and more particularly, to an article of manufacture that simulates the appearance of a book, for example, which is constructed and arranged to function as a game as well as an educational device for children and young adults.

---

This application is a continuation-in-part of applicant's co-pending application Ser. No. 513,316, filed on Dec. 13, 1965, and entitled "Article of Manufacture."

Objects of the invention

It is a primary object of the present invention, therefore, to provide an article of manufacture that simulates the appearance of a book, for example, but which is constructed and arranged to function as a game as well as an educational device for children and young adults.

Another primary object of this invention, in addition to the foregoing objects, is to provide an article of manufacture that, while simulating the appearance of a book, for example, is constructed and arranged to function as a game as well as an educational device for children and young adults, enabling the child or young adult to increase his or her vocabularly, his or her knowledge of the various poems or stories that are usually familiar to such an age group, as well as to further his or her understanding and appreciation of the various colors of the spectrum, color combinations and arrangements, and the like.

Yet another primary object of the present invention, in addition to each of the foregoing objects, to to provide an article of manufacture that, while simulating the appearance of a book, for example, is constructed and arranged to function as a game or educational device that will enhance the co-ordinating abilities of children and young adults, enhance their abilities to recognize relationships, and will enhance their understanding of words and word combinations when utilized in an evironment in which they are applicable.

A further primary object of this invention, in addition to the foregoing objects, is to provide an article of manufacture that, while simulating the appearance of a book, for example, is yet constructed and arranged to function as a game as well as an eductional device that will enhance the ability of a child or young adult to independently think, arrange, design, create, and in general function to aid in the development of his or her abilities while in the formative stages.

Other object and important features of the present invention will be apparent from a study of the specification following taken with the drawing, which together, show, illustrate, describe and disclose a preferred embodiment of the invention and what is now considered to be the best mode of practicing the principles thereof. Other embodiments and modifications may be suggested to those having the benefit of the teachings herein, and such other embodiments or modifications are intended to be reserved especially as they fall within the scope and spirit of the subjoined claims.

Description

In the drawing:

FIG. 1 is an isometric view of an article of manufacture constructed in accordance with the principles of the present invention, and simulating, for example, the appearance of a book;

FIG. 2 is an elevational view of an exemplary form of container in which certain elements comprising a part of the article of manufacture shown in FIG. 1 may be packaged and distributed;

FIG. 3 is a cross-sectional view taken along the line 3—3 of FIG. 1;

FIG. 4 is an exploded isometric view of one of the pages of the article of manufacture shown in FIG. 1, showing therein exemplary elements to be utilized therewith; and FIG. 5 is an elevational view of additional exemplary elements to be utilized with the article of manufacture shown in FIG. 1.

With reference now to the drawings, and particularly to FIG. 1, there is illustrated therein an article of manufacture constructed in accordance with the principles of the present invention, and generally designated by the reference character 10.

The article of manufacture 10 simulates the appearance of a book and comprises a front cover 12, a back cover 14, and a backbone 16. The article 10 further comprises a plurality of pages generally designated by the reference character 18. The pages may be secured to the backbone 16 in any suitable and conventional manner.

The pages 18 may be fabricated of any suitable material. Preferably, however, the pages 18 (see FIG. 3) are fabricated of a plurality of layers of material for reasons that will more fully be described hereinafter. Thus, the pages 18 each comprise a facing layer 20, that may be constructed of any suitable material, such as a cloth or fabric, an intermediate layer 22 that may be fabricated of any suitable material, such as an elastomeric material, a plastic material, a material constructed of wood pulp or the like, and a backing layer 24 which may be fabricated of any suitable material, such as a plastic. The facing layer 20 may be fixedly secured to the intermediate layer 22 in any suitable manner, and for example it may be bonded thereto, or one of the facing layer 20 or the intermediate layer 22 may be provided with an adhesive surface enabling these layers to adhesively be secured to one another. The intermediate layer 22 and the backing layer 24 may be fixedly secured to one another in any suitable manner, and for example, may be secured to one another in the same manner as the layer 20 is secured to the layer 22.

The pages 18 of the article of manufacture or book 10 further comprise a plurality of securing elements 26 which are positioned or disposed relative thereto in a predetermined pattern, for purposes that will more fully be described hereinafter. The securing elements 26 may be of any suitable and conventional construction, and for example, may comprise the male element of conventional snap-type fasteners. The elements 26 are positioned or disposed relative to the pages 18 in predetermined pattern that simulates the appearance of the letter T that has been turned up-side-down. It will be understood that this predetermined pattern is illustrated for exemplary purposes only, and is not in any way intended to be limiting. Accordingly, other predetermined patterns may be utilized, it being kept in mind that the chosen predetermined pattern will preferably be utilized upon at least two of the pages 18.

The article of manufacture or book 10 further comprises a plurality of groups of design elements generally designated by the reference character 28. With particular reference now to FIGS. 1 and 4, one such group generally designated by the reference character 30 is illustrated therein, and comprises one design element 32 that simulates the appearance of a flowerpot, another design element 34 that simulates the appearance of the stem of a flower, having a plurality of leaves 36, and further design elements 38, 40, 42 that simulate the appearance of flowers. In FIG. 1, the group of design elements 30 is illustrated as being disposed in an assembled relationship in the environment of the page with respect to which it is associated. In this assembled relationship, it will be understood that the elements 32–42 thereof comprise a plurality of fastening elements 44 which, when taken together, define a predetermined pattern that corresponds with the predetermined pattern of the securing elements of the page 18. The fastening elements 44 may be of any suitable or conventional construction, and for example, may be comprised of the female element of conventional snap-type fasteners that will co-operate with the male elements positioned relative to the page 18.

As pointed out above, the design elements 32–42 when taken together comprise a plurality of the fastening elements 44 that define a predetermined pattern corresponding with the pattern on the page 18. It will now be understood that the individual design elements 32–42 each comprise one or more of the fastening elements 44 that go towards making up this corresponding predetermined pattern. Thus, the element 32 simulating the appearance of a flowerpot comprises two of the fastening elements 44, the stem or stalk 34 comprises six of the fastening elements 44, and each of the design elements 38, 40, 42 comprise one of the design elements 44. The latter comprise only one of the fastening elements since that is all that is required to suitably secure them relative to the page 18. The flowerpot design element 32 comprises two of the fastening elements 44, since that number is required for fixedly securing this element to the page 18. And, finally, the stem or stalk design element 34 comprises six of the fastening elements 44 for a similar reason.

The design elements 32–42 may be fabricated of any suitable material, and for example, may be fabricated of a suitable plastic material that readily accepts non-toxic coloring materials or paints.

With continued reference to FIG. 1, another group 46 of design elements comprises those elements that will simulate the appearance of a Christmas tree, for example, and in addition may comprise elements that simulate the appearance of those articles or items generally used with a tree of this nature, such as Christmas bulbs, packages, and the like. In FIG. 5, there is illustrated yet another group 48 comprising a design element 50 that simulates the appearance of a mother hen, another design element 52 that simulates the appearance of an egg, and design elements 54, 56 simulating the appearance of a newborn chick just recently hatched. The groups 46 and 48 each comprise fastening elements 44 which, when the design elements of which the groups 46 and 48 are comprised, are taken together define a predetermined pattern thereof that corresponds with the pattern defined by the securing elements 26.

It will be understood, at this point, that the groups 30, 46, and 48 are adapted to be positioned relative to different ones of the pages 18 of the article of manufacture or book 10. The design elements comprising the groups may be positioned or secured relative to the pages 18 when the article of manufacture or book is packaged for distribution and sale. If desired, one or more of the groups may be positioned relative to the pages 18, while others of the groups are positioned within packages or containers that are distributed and sold therewith. For example, and with reference now to FIG. 2, there is shown therein a package or container 58 which may be fabricated of any suitable material, such as paper, plastic, or the like, within which the design elements of one or more groups are adapted to be disposed for distribution and sale. The package or container 58 may comprise a substantially rigid non-containing portion 60 upon which any suitable legend or indicia may be placed.

In the use of an article of manufacture constructed in accordance with the principles set forth herein, a child or young adult may disassemble the design elements of any one of the groups thereof of which the article or book 10 is comprised, and reassemble the design elements of that group with respect to a page 18 different than the one with respect to which it was originally assembled. Moreover, the design elements of one group may be interchanged with the design elements of another group, enabling the child to create designs, relationships, color combinations, arrangements and the like by utilizing his or her own ability to think, create and design independently. The groups of design elements may be packaged separately with respect to the pages 18, and the latter provided with an outline of the design elements and suitable indicia or legends defining them. In this instance, the article of manufacture 10 will function not only as a toy but as an educational device for increasing the child's or young adult's vocabulary. In still another instance, the predetermined patterns of securing elements 26 may be different on each of the pages 18. Similarly, the predetermined patterns of fastening elements 44 of the groups of design elements may be different from one to the other, with the pattern of fastening elements of only one group of design elements corresponding with the pattern of securing elements 26 of only one of the pages 18. In this instance, the article of manufacture 10, in addition to functioning as a toy, will function as an educational device in that it presents the characteristics of a puzzle, tending to develop a child's or young adult's co-ordination, recognition, and organization.

It is equally within the scope of the present invention to configure, construct and arrange the design elements of a group to simulate the pieces of a puzzle, and to position the securing elements 26 in a pattern relative to the page 18, and the fastening elements 44 in a pattern relative to the design elements themselves accordingly. Hereto, the article of manufacture will function not only as a toy or game, but as an educational device as well for each and every one of the reasons pointed out above.

It is emphasized that will the article of manufacture 10 hereinbefore described, disclosed, shown and illustrated simulates the appearance of a book comprising a plurality of pages 18, the article of manufacture can be configured, constructed and arranged to simulate the appearance of other articles with which children or young adults are familiar. Such other or additional articles, like the book described, disclosed, shown and illustrated herein, will comprise a plurality of elements such as the pages 18, and thus to faciliate an understanding of this invention, these elements in the claims here appended may be referred to as basic elements. With this view in mind, the design elements, such as the elements 32–42 shown in FIG. 4 will be referred to as such, and the groups of design elements will be denoted in a like manner.

What is claimed is:

1. An article of manufacture comprising a plurality of basic elements each having a predetermined pattern of securing elements positioned thereupon, and a plurality of groups of design elements each being a plurality of fastening elements positioned thereupon, the fastening elements, when taken together, defining a predetermined pattern of fastening elements that corresponds with the pattern of securing elements, enabling each group of design elements to be assembled relative to a basic element, and further enabling the design elements of said groups to be interchanged with respect to one another to define varying arrangements of groups of design elements with respect to different ones of said basic elements.

2. An article of manufacture as defined in claim 1, wherein there is provided a plurality of basic elements each of which comprises a pattern of securing elements positioned relative thereto, the pattern of securing elements of some of the basic elements differing with respect to the pattern of securing element positioned relative to other of said basic elements, and wherein the design elements of said groups, when taken together, define a pattern of fastening elements, the pattern of fastening elements defined by the design elements of some of said groups corresponding with the pattern of securing elements on some of the basic elements, and the pattern of fastening elements defined by the design elements of other groups thereof defining patterns that correspond with the pattern of securing elements of some of the other of said basic elements, enabling said basic elements to be provided with suitable indicia or legends that define the design elements, further enabling the vocabulary of a child or young adult to be improved, increased and enhance.

3. An article of manufacture as defined in claims 1 or 2, wherein said basic elements are fabricated of a plurality of layers of material, one of said layers of material being chosen to enable colors, prints, patterns, designs, and the like, to be applied thereto and to define an environment.

4. An article of manufacture as defined in claims 1 or 2, wherein said basic elements each comprise a facing layer fabricated from the group of materials consisting of cloth, fabrics, an intermediate layer fabricated from one of the materials in the group consisting of elastomers, plastics, and woodpulp, and a backing layer fabricated of a plastic material.

5. An article of manufacture configured, constructed and arranged to simulate the appearance of a book, comprising a plurality of pages, each page having a predetermined pattern of securing elements positioned thereupon, and a plurality of groups of design elements, the design elements of each group having at least one fastening element, and the fastening element of each design element of each of said groups, when taken together, defining a predetermined pattern thereof, that corresponds with the pattern of securing elements positioned upon at least one of said pages.

6. An article of manufacture as defined in claim 5, wherein the pattern of securing elements positioned upon at least one of said pages being different than the pattern positioned upon at least one other of said pages.

7. An article of manufacture as defined in claim 5, wherein the pattern positioned upon said pages is predetermined, and is substantially the same from one page to the next.

References Cited

UNITED STATES PATENTS 2,810,576  10/1957  Massey _____ 272—25
3,274,706  9/1966  Friend _____ 35—28 X LOUIS G. MANCENE, Primary Examiner ROBERT F. CUTTING, Assistant Examiner U.S. Cl. X.R.

35—28; 46—34, 35, 157